United States Patent
Schank

(10) Patent No.: US 11,713,114 B2
(45) Date of Patent: Aug. 1, 2023

(54) ROCKET-TURBINE-POWERED VTOL AIRCRAFT

(71) Applicant: Textron Innovations Inc., Providence, RI (US)

(72) Inventor: Troy Cyril Schank, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 110 days.

(21) Appl. No.: 17/196,643

(22) Filed: Mar. 9, 2021

(65) Prior Publication Data

US 2021/0284332 A1    Sep. 16, 2021

Related U.S. Application Data

(60) Provisional application No. 62/987,970, filed on Mar. 11, 2020.

(51) Int. Cl.
*B64C 29/00* (2006.01)
*B64D 27/02* (2006.01)
*B64D 27/12* (2006.01)

(52) U.S. Cl.
CPC ........ *B64C 29/0025* (2013.01); *B64D 27/023* (2013.01); *B64D 27/12* (2013.01); *B64C 2211/00* (2013.01); *B64D 2027/026* (2013.01)

(58) Field of Classification Search
CPC ............ B64C 29/0025; B64C 2211/00; B64D 27/023; B64D 27/12; B64D 2027/026
See application file for complete search history.

(56) References Cited

U.S. PATENT DOCUMENTS

| | | | | |
|---|---|---|---|---|
| 2,713,243 | A * | 7/1955 | Seaver ..................... | F02K 9/78 60/225 |
| 8,152,096 | B2 * | 4/2012 | Smith ................. | B64C 29/0033 244/12.4 |
| 2016/0297520 | A1* | 10/2016 | Sada-Salinas ...... | B64C 29/0025 |
| 2021/0031913 | A1* | 2/2021 | Martel ................. | B64D 27/023 |
| 2021/0197965 | A1* | 7/2021 | Kunz .................. | B64C 29/0025 |
| 2022/0009626 | A1* | 1/2022 | Baharav ................. | B64C 39/04 |

OTHER PUBLICATIONS

Power Transmission Engineering (www.powertransmission.com), Mar. 2017, Baldor Basics: Motors, pp. 42-47.
Marignetti, F.; Rubino, G., Perspectives on Electric Machines with Cryogenic Cooling, Energies 2023, 16, 2994.

* cited by examiner

*Primary Examiner* — Brady W Frazier
*Assistant Examiner* — Shanna Danielle Glover
(74) *Attorney, Agent, or Firm* — Bradley Arant Boult Cummings

(57) ABSTRACT

A vertical-takeoff-and-landing ("VTOL") aircraft including a non-VTOL aircraft equipped for forward takeoff and flight and a modular boom system interoperably coupled to the non-VTOL aircraft. The modular boom system includes a first modular boom and a second modular boom. The first modular boom includes a first rocket-turbine engine. The first modular boom is mounted to a first wing of the non-VTOL aircraft. The second modular boom includes a second rocket-turbine engine. The second modular boom is mounted to a second wing of the non-VTOL aircraft.

12 Claims, 5 Drawing Sheets

ROCKET-TURBINE-POWERED VTOL AIRCRAFT

CROSS-REFERENCE TO RELATED APPLICATIONS

This patent application claims the benefit of U.S. provisional patent application No. 62/987,970 filed on Mar. 11, 2020, which application is incorporated by reference.

TECHNICAL FIELD

The present invention relates generally to systems that require high power output for short periods of time and more particularly, but not by way of limitation, to systems and methods for vertical takeoff and landing ("VTOL") aircraft.

BACKGROUND

This section provides background information to facilitate a better understanding of the various aspects of the disclosure. It should be understood that the statements in this section of this document are to be read in this light and not as admissions of prior art.

Traditional fixed wing aircraft require a long runway to take off and land. However, in some applications, it is desirable to have a fixed wing aircraft that can take off and land vertically. Such an arrangement allows the aircraft to take off and land without the need for a runway. These types of aircraft are known as vertical takeoff and landing ("VTOL") aircraft.

Another solution to the lack of a runway has been to utilize, for example, a catapult of some sort to launch an aircraft and a net or other type of containment device to catch the aircraft upon landing. However, arrangements such as catapults and nets often are expensive, take up considerable space, and require a considerable amount of time to assemble and disassemble. In addition, such arrangements are in some cases unreliable and can result in damage to the aircraft.

In light of the above, there is a need for an aircraft with VTOL capability that does not require arrangements such as catapults and nets when a runway is not available for takeoff and landing.

SUMMARY

This summary is provided to introduce a selection of concepts that are further described below in the detailed description. This summary is not necessarily intended to identify key or essential features of the claimed subject matter, nor is it intended to be used as an aid in limiting the scope of claimed subject matter.

A vertical-takeoff-and-landing ("VTOL") aircraft including a non-VTOL aircraft equipped for forward takeoff and flight and a modular boom system interoperably coupled to the non-VTOL aircraft. The modular boom system includes a first modular boom and a second modular boom. The first modular boom includes a first rocket-turbine engine. The first modular boom is mounted to a first wing of the non-VTOL aircraft. The second modular boom includes a second rocket-turbine engine. The second modular boom is mounted to a second wing of the non-VTOL aircraft.

A vertical-takeoff-and-landing ("VTOL") aircraft includes a non-VTOL aircraft equipped for forward takeoff and flight and a modular boom that includes a rocket-turbine engine and mounted to the non-VTOL aircraft.

A method of operating a vertical-takeoff-and-landing ("VTOL") aircraft includes vertically lifting the VTOL aircraft via a modular boom system. The modular boom system includes a rocket-turbine engine. The method also includes jettisoning the modular boom system and flying the VTOL aircraft in forward flight.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
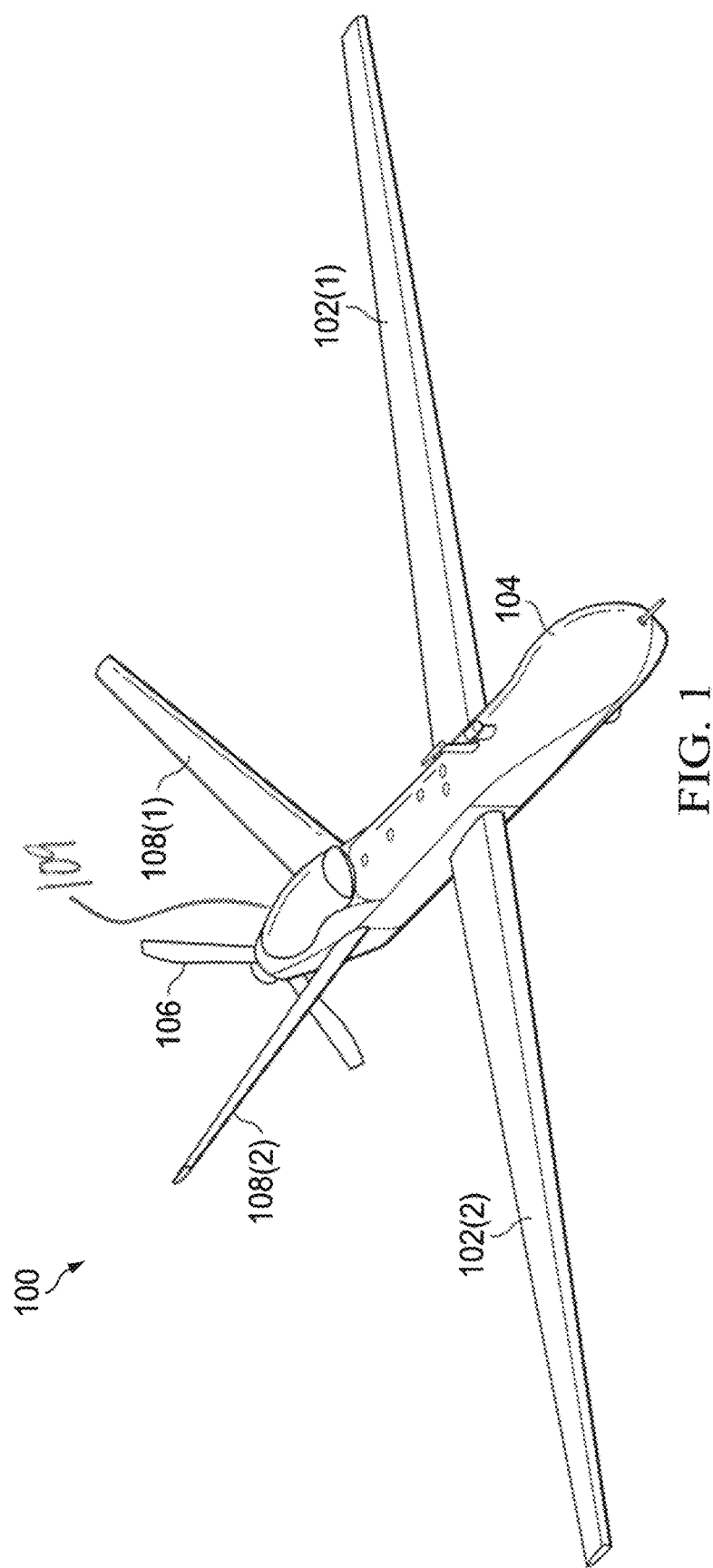
FIG. 1 illustrates an aircraft.

Various embodiments will now be described more fully with reference to the accompanying drawings. The disclosure may, however, be embodied in many different forms and should not be construed as limited to the embodiments set forth herein.

An aircraft that can perform vertical takeoff and landing ("VTOL") preferably is self-contained so that the aircraft can take off and land without the need for a runway or additional infrastructure such as, for example, external catapults and nets. However, if the infrastructure necessary for VTOL is part of the aircraft, it is desirable to minimize the amount of so-called parasitic weight due to VTOL infrastructure that is carried by the aircraft when the aircraft is in forward-flight mode. It is typically understood that the amount of power required for a VTOL aircraft in hover during VTOL is ~3-4 times the power required for the aircraft to fly in forward-flight mode on the wing.

In light of the above, it is desirable to optimize the VTOL propulsion system so that an undue parasitic-weight burden is not paid during forward flight. In addition, because of the greater power requirements during vertical takeoff and landing, a significant amount of power must be applied to achieve VTOL.

At smaller aircraft sizes, quad-copter electrical propulsion systems have been successfully used. This is often seen in small drones used by hobbyists. Although electrical propulsion systems may be used on such small aircraft to allow vertical takeoff and landing, attempts to scale such electrical propulsion systems to larger aircraft sizes are not feasible because, while wings scale up as a function of area, aircraft weight scales as a function of volume.

For example, a relatively small aircraft with a maximal takeoff weight ("MTOW") of 250 lbs. can employ an electrical propulsion system with a power density of 1 kW/kg to achieve VTOL capability. Such an electrical system would have an estimated parasitic weight due to electrical motors and battery weight of the electrical propulsion system used for VTOL of 74 lbs., or ~29% of MTOW.

As another example, a larger aircraft with a maximal takeoff weight ("MTOW") of 10,500 lbs. can employ an electrical propulsion system with a power density of 1 kW/kg to achieve VTOL capability. Such an electrical system would have an estimated parasitic weight due to electrical motors and battery weight of the electrical propulsion system used for VTOL of 3,940 lbs., or ~38% of MTOW. It is therefore apparent that, as aircraft size grows, electrical propulsion systems for VTOL become less attractive due to increased parasitic weight relative to MTOW.

The necessary electric motors and batteries of an electrical propulsion system become heavier and heavier relative to the size of the aircraft as aircraft size increases. As the aircraft gets larger, the batteries take up increasingly more of the available payload of the aircraft. At larger sizes, the maximal takeoff weight of the aircraft is consumed more and more by batteries necessary to power the electrical propulsion system.

In a typical application, the VTOL mode of the aircraft is utilized only for a short amount of time. For example, vertical takeoff and landing of the aircraft often lasts one minute or less. Higher power density power sources are attractive because they result in less parasitic weight when the aircraft is in forward flight mode. Less parasitic weight consumed by VTOL infrastructure allows for more fuel or equipment to be carried onboard the aircraft, which can result in increased capability and endurance of the aircraft in forward flight mode.

Among the different possibilities for power that can be used in VTOL applications are internal combustion piston engines, room temperature electric machines, gas turbines, and rocket turbines. Typical internal combustion engines have power densities on the order of 1-2 kW/kg. Power output for such typical internal combustion piston engines is on the order of 100-400 kW. Typical room temperature electric machines have higher power densities of 5-6 kW/kg and power output from 10-250 kW. Typical gas turbines have power densities in the range of 3-10 kW/kg and power output of 500-7,000 kW.

Typical rocket turbines used in the 1950s-1970s have power densities that are much greater than any of the previously mentioned power sources. For example, many pre-1970s rocket turbines used in the U.S. space program had power densities of 30 kW/kg or greater. In similar fashion, many of these rocket turbines had power output of 20-1,000 kW. Thus, the rocket turbines appear to be the most attractive power source from a power density standpoint relative to any of internal combustion piston engines, room temperature electric machines, and gas turbines.

Another consideration for assessment of different power sources is brake-specific fuel consumption. Brake-specific fuel consumption is a measure of the amount of fuel used by a power source per unit of power and time. It is typically measured in lb/hp hr. Gasoline internal combustion piston engines have brake-specific fuel consumption in a typical range of 0.37-0.45 lb/hp hr. Diesel internal combustion piston engines are typically in the range of 0.25-0.34 lb/hp hr. Turboshaft engines utilizing gas turbine technology are typically in the range of 0.34-0.55 lb/hp hr. Rocket turbines have much higher brake-specific fuel consumption, and are typically in the range of 8.5-19.5 lb/hp hr. It is thus apparent that rocket turbines consume fuel at a rate that is at least an order of magnitude greater than the rates of the other three types of power sources discussed above. However, as noted above, VTOL applications are typically used only for very short periods of time such as, for example, one minute or less. Therefore, the high brake specific fuel consumption of rocket turbines will, in typical applications, not be problematic because of the short duration of operation for VTOL.

Turning now to the FIGURES, FIG. 1 illustrates an aircraft 100. The aircraft 100 includes wings 102(1) and 102(2), a fuselage 104, a propeller 106, stabilizers 108(1) and 108(2), and an engine 109. The aircraft 100 is, in a typical embodiment, adapted for long-range flight, for example, of up to 24 hours. The aircraft 100 may be equipped with various equipment, such as, for example, still and video cameras for purposes of surveillance. The aircraft 100 as shown in FIG. 1 is not capable of vertical takeoff and landing.

Figure 2:
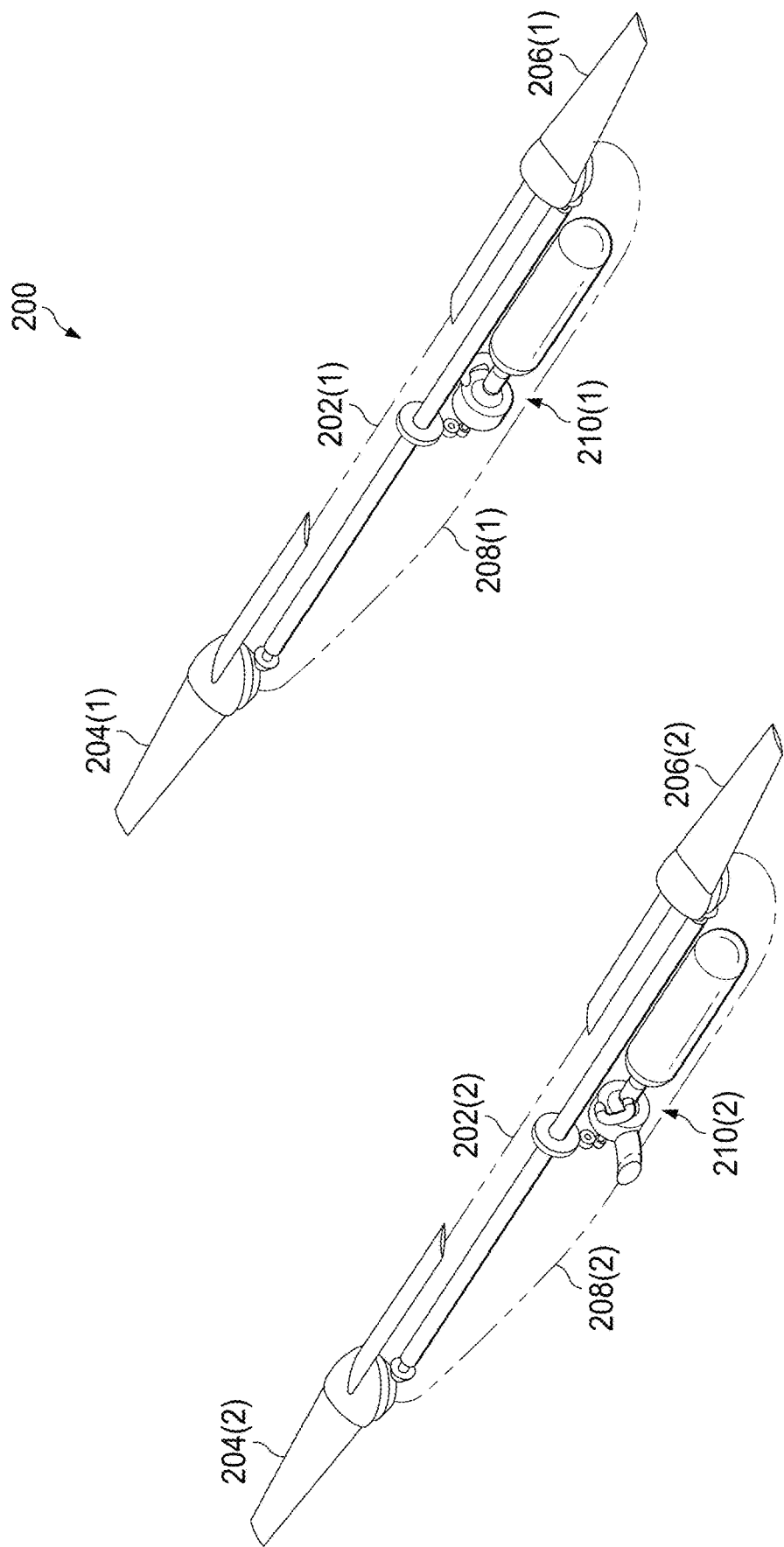
FIG. 2 illustrates a VTOL modular boom system.

Referring now to FIG. 2, a VTOL modular boom system 200 is illustrated. The VTOL modular boom system 200 includes a modular boom 202(1) and a modular boom 202(2). The modular boom 202(1) and the modular boom 202(2) are mirror images of one another.

The modular boom 202(1) includes an aft propeller 204(1) and a fore propeller 206(1). In similar fashion, the modular boom 202(2) includes an aft propeller 204(2) and a fore propeller 206(2). The modular boom 202(1) includes a housing 208(1), while the modular boom 202(2) includes a housing 208(2). Also shown is a drive system 210(1) of the modular boom 202(1) and a drive system 210(2) of the modular boom 202(2), further details of which will be described below. The drive system 210(1) drives the aft propeller 204(1) and the fore propeller 206(1) while the drive system 210(2) drives the aft propeller 204(2) and the fore propeller 206(2) when the VTOL modular boom system 200 is being used to allow an aircraft to operate in VTOL mode.

Figure 3:
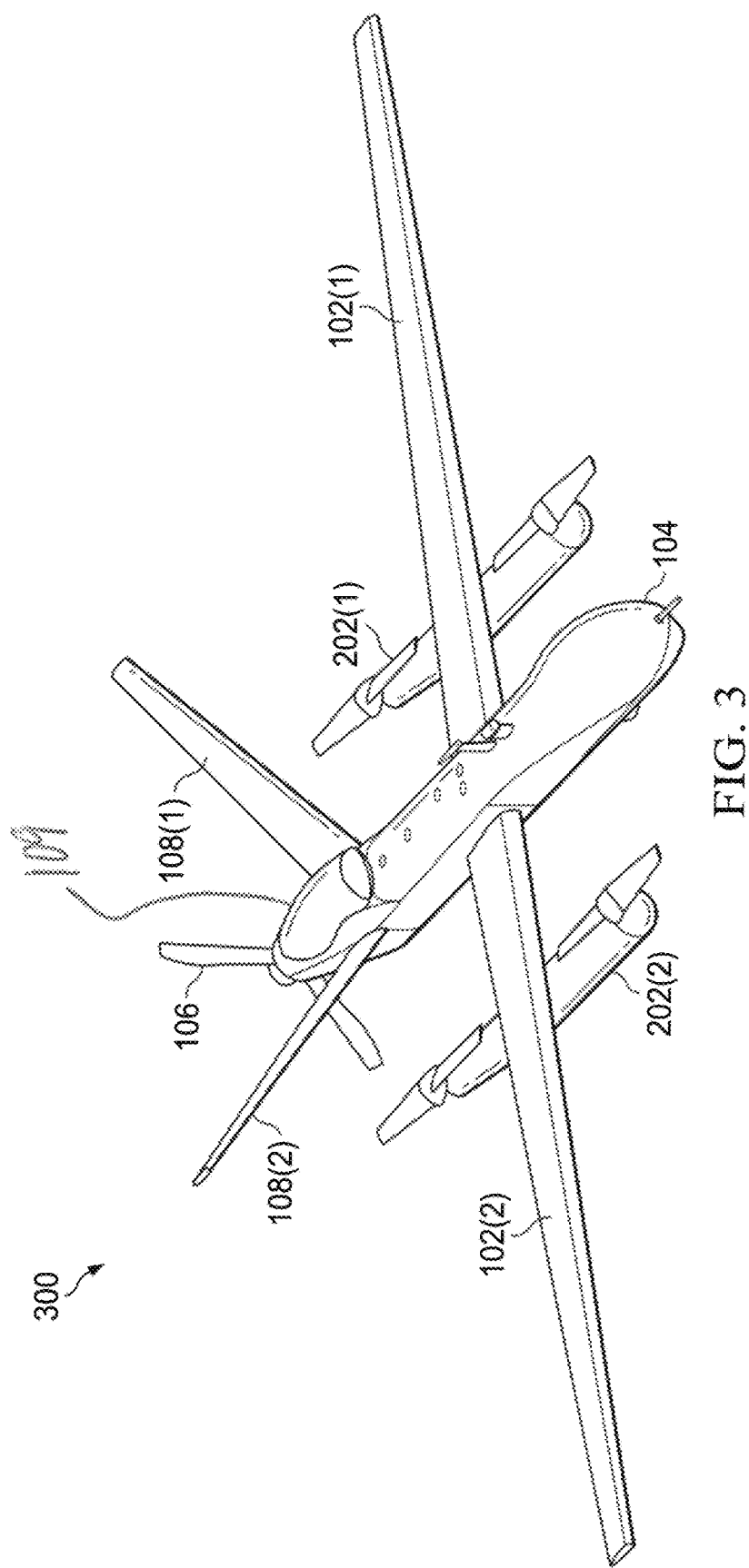
FIG. 3 illustrates a VTOL aircraft.

FIG. 3 illustrates a VTOL aircraft 300. The VTOL aircraft 300 is a combination of the aircraft 100 of FIG. 1 and the VTOL modular boom system 200 of FIG. 2. As shown in FIG. 3, the modular boom 202(1) is mounted to the wing 102(1), while the modular boom 202(2) is mounted to the wing 102(2). It will be apparent that the VTOL modular boom system could be retrofitted to an aircraft such as, for example, the aircraft 100, or could be designed as part of a new aircraft. The VTOL modular boom system 200 can be permanently attached to the aircraft 100 or could be designed to be jettisoned, for example, after vertical takeoff. In such a case, the VTOL modular boom system 200 could be outfitted, for example, parachutes to avoid damage to the VTOL modular boom system 200 following jettisoning thereof.

Figure 4:
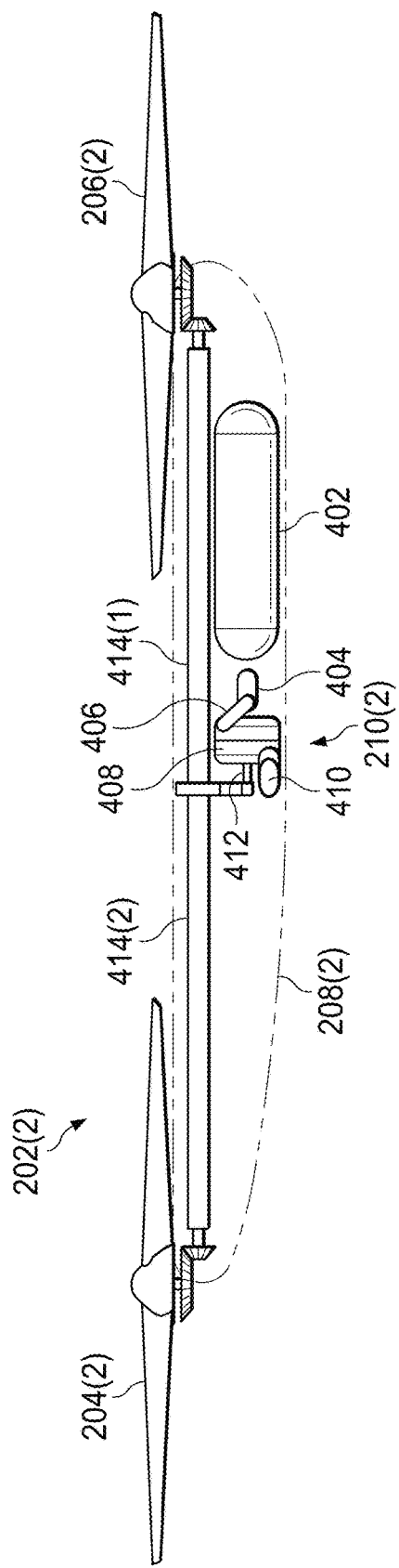
FIG. 4 illustrates a modular boom in detail.

FIG. 4 illustrates in more detail the modular boom 202(2), it being understood that the modular boom 202(1) is a mirror image of the modular boom 202(2). In order to achieve high power density necessary to allow vertical takeoff and landing of an aircraft with minimal parasitic weight when the aircraft is in forward-flight mode, and given the fact that vertical takeoff and landing are typically of relatively short time duration, a propulsion system for vertical takeoff and landing based upon rocket-turbine technology has been determined to be suitable.

Rocket-turbine technology has been known since the 1950s. In typical embodiments, rocket turbines provide power density on the order of 20-1,000 kW/kg. In addition, rocket-turbines are relatively simple compared to gas turbines in that the compressors used in gas turbine engines are not necessary in rocket-turbine engines.

Returning to FIG. 4, the drive system 210(2) includes a pressure bottle 402 that supplies oxygen under pressure, a combustion chamber gas generator 404, an inlet manifold 406, a power turbine 408, an exhaust 410, and a power takeoff 412. Also illustrated are drive mechanisms 414(1) and 414(2) to supply power from the power takeoff to the aft propeller 204(2) and the fore propeller 206(2). Although the drive mechanisms 414(1) and 414(2) are illustrated as including mechanical gears and other mechanical linkages, it will be apparent that other types of systems can be used to apply power from the power takeoff 412 to the propellers 204(2) and 206(2) such as, for example, hydraulic systems, hybrid mechanical/electrical systems, etc.

Figure 5:
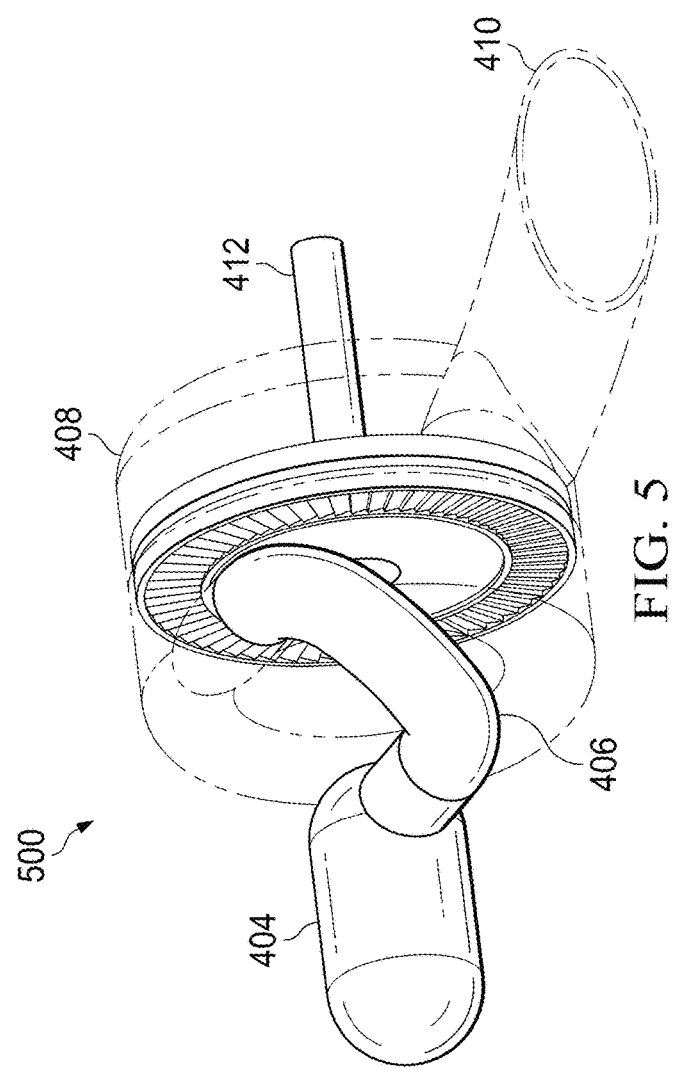
FIG. 5 illustrates a rocket-turbine engine.

FIG. 5 illustrates a rocket-turbine engine 500, the rocket-turbine engine 500 being an illustration in more detail of various components shown in FIG. 4. The rocket-turbine engine 500 includes the power turbine 408, which is fed by the inlet manifold 406 from the combustion chamber gas generator 404. The power takeoff 412 provides mechanical power to power the aft propeller 204(2) and the fore propeller 206(2). Also shown coupled to the power turbine 408 is the exhaust 410.

Figure 6:
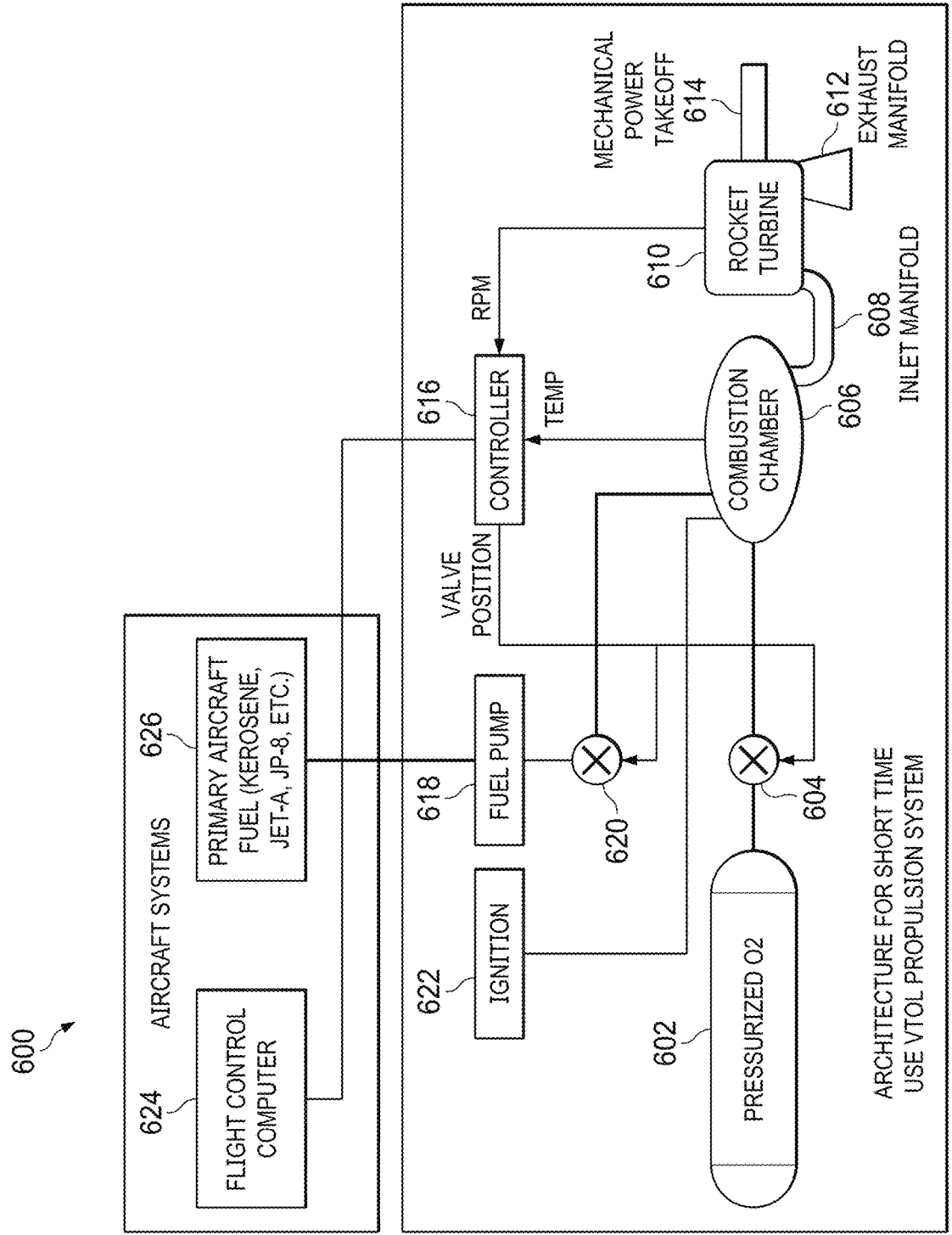
FIG. 6 illustrates a rocket-turbine-engine VTOL system.

Referring now to FIG. 6, a rocket-turbine-engine VTOL system 600 is illustrated. The rocket-turbine-engine VTOL system 600 includes pressurized $O_2$ used as an oxidizer. Although $O_2$ is illustrated as the oxidizer and a pressurized tank 602 is shown, it will be apparent that other gases could be used besides oxygen and that other technologies, such as liquid oxygen or cold gas technology could be utilized instead of a pressurized tank. In the rocket-turbine-engine VTOL system 600, pressurized $O_2$ is fed from the pressurized tank 602 via a control valve 604 to a combustion chamber 606. Fuel 626, which in a typical embodiment is the primary aircraft fuel used in forward flight mode, is fed via a fuel pump 618 and a control valve 620 to the combustion chamber 606.

Ignition 622 ignites the oxygen and fuel mixture in the combustion chamber 606. The pressurized hot gases from the combustion chamber 606 are fed via an inlet manifold 608 to a rocket turbine 610. The rocket turbine 610 powers a mechanical power takeoff 614 and outputs exhaust gases via an exhaust manifold 612. A flight control computer 624 is used to control a controller 616. The controller 616 receives inputs from the combustion chamber 606 in the form of temperature and the rocket turbine 610 in the form of revolutions per minute.

Use of a rocket turbine such as described herein for VTOL is not the only possible use. Other possible uses in which a short-duration high power density power source could be useful include, for example, powering of weapons such as microwave or laser weapons, jamming systems, or supplemental power systems in the event of a primary power-source failure. In addition, although a quad-copter configuration using propellers is illustrated herein, other numbers of propellers could be utilized. Moreover, ducted fans or other mechanisms for providing lift could be used instead of propellers.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within 10% of" what is specified.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A vertical-takeoff-and-landing ("VTOL") aircraft comprising:
   a non-VTOL aircraft equipped with an engine selected from the group consisting of internal combustion piston engines, room temperature electric machines, and gas turbines, the engine being for forward takeoff and flight; and
   a modular boom system interoperably coupled to the non-VTOL aircraft, the modular boom system comprising:
      a first modular boom comprising a first rocket-turbine engine, the first modular boom mounted to a first wing of the non-VTOL aircraft; and
      a second modular boom comprising a second rocket-turbine engine, the second modular boom mounted to a second wing of the non-VTOL aircraft;
   wherein:
      the first modular boom comprises a first-modular-boom fore propeller and a first-modular-boom aft propeller, the first-modular-boom fore propeller and the first-modular-boom aft propeller being driven by the first rocket-turbine engine; and
      the second modular boom comprises a second-modular-boom fore propeller and a second-modular-boom aft propeller, the second-modular-boom fore propeller and the second-modular-boom aft propeller being driven by the second rocket-turbine engine.

2. The VTOL aircraft of claim 1, wherein the modular boom system is permanently attached to the non-VTOL aircraft.

3. The VTOL aircraft of claim 1, wherein the modular boom system has been retrofitted to the non-VTOL aircraft.

4. The VTOL aircraft of claim 1, wherein the modular boom system is equipped to be jettisoned from the non-VTOL aircraft after the non-VTOL aircraft has taken off.

5. The VTOL aircraft of claim 1, wherein:
the first modular boom comprises a first-modular-boom fore propeller and a first-modular-boom aft propeller, the first-modular-boom fore propeller and the first-modular-boom aft propeller being driven by the first rocket-turbine engine; and
the second modular boom comprises a second-modular-boom fore propeller and a second-modular-boom aft propeller, the second-modular-boom fore propeller and the second-modular-boom aft propeller being driven by the second rocket-turbine engine.

6. The VTOL aircraft of claim 1, wherein the first rocket-turbine engine, the second rocket-turbine engine, and engine of the non-VTOL aircraft use the same fuel source.

7. A vertical-takeoff-and-landing ("VTOL") aircraft comprising:
a non-VTOL aircraft equipped with an engine selected from the group consisting of internal combustion piston engines, room temperature electric machines, and gas turbines, the engine being for forward takeoff and flight; and
a modular boom mounted to the non-VTOL aircraft and comprising:
a rocket turbine engine; and
a first-modular-boom fore propeller and a first-modular-boom aft propeller, the first-modular-boom fore propeller and the first-modular-boom aft propeller being driven by the rocket-turbine engine.

8. The VTOL aircraft of claim 7, wherein the modular boom comprises a propeller driven by the rocket-turbine engine.

9. The VTOL aircraft of claim 7, wherein the modular boom is permanently attached to the non-VTOL aircraft.

10. The VTOL aircraft of claim 7, wherein the modular boom has been retrofitted to the non-VTOL aircraft.

11. The VTOL aircraft of claim 7, wherein the modular boom is equipped to be jettisoned from the non-VTOL aircraft after the non-VTOL aircraft has taken off.

12. The VTOL aircraft of claim 7, wherein the rocket-turbine engine and the engine of the non-VTOL aircraft use the same fuel source.

* * * * *